(12) United States Patent
Yang et al.

(10) Patent No.: US 11,723,055 B2
(45) Date of Patent: Aug. 8, 2023

(54) METHOD FOR RESOURCE SCHEDULING AND NETWORK NODE

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/086,810

(22) Filed: Nov. 2, 2020

(65) Prior Publication Data
US 2021/0051687 A1 Feb. 18, 2021

Related U.S. Application Data

(63) Continuation of application No. PCT/CN2019/082915, filed on Apr. 16, 2019.

(60) Provisional application No. 62/667,502, filed on May 5, 2018.

(51) Int. Cl.
*H04W 72/50* (2023.01)
*H04W 76/27* (2018.01)
*H04W 56/00* (2009.01)
*H04W 72/1263* (2023.01)
*H04W 72/23* (2023.01)
*H04W 72/566* (2023.01)

(52) U.S. Cl.
CPC ..... *H04W 72/535* (2023.01); *H04W 56/0045* (2013.01); *H04W 72/1263* (2013.01); *H04W 72/23* (2023.01); *H04W 72/566* (2023.01); *H04W 76/27* (2018.02)

(58) Field of Classification Search
None
See application file for complete search history.

(56) References Cited

U.S. PATENT DOCUMENTS

| 11,357,003 B2* | 6/2022 | Ji ............ H04W 72/0446 |
| 2012/0044816 A1 | 2/2012 | Ratasuk et al. |
| 2016/0227556 A1 | 8/2016 | Han |

(Continued)

FOREIGN PATENT DOCUMENTS

| CN | 101965037 A | 2/2011 |
| EP | 3711186 A1 | 9/2020 |

(Continued)

OTHER PUBLICATIONS

Extended European Search Report for EP Application 19799003.9 dated May 10, 2021. (9 pages).

(Continued)

*Primary Examiner* — Jutai Kao
(74) *Attorney, Agent, or Firm* — Young Basile Hanlon & MacFarlane, P.C.

(57) ABSTRACT

Methods for resource pre-scheduling are provided. Radio resources scheduled for user equipment are obtained. Scheduling information including the scheduled radio resources is transmitted to the user equipment. The scheduling information is configured to instruct the user equipment to use the scheduled radio resources to transmit or receive data after a predetermined time or after a time indicated by the scheduling information.

13 Claims, 5 Drawing Sheets

(56) References Cited

U.S. PATENT DOCUMENTS

| | | | |
|---|---|---|---|
| 2017/0202054 A1* | 7/2017 | Rathonyi | H04L 69/28 |
| 2018/0070341 A1 | 3/2018 | Islam et al. | |
| 2019/0053316 A1* | 2/2019 | Aiba | H04W 76/27 |
| 2019/0141679 A1* | 5/2019 | He | H04L 5/0053 |
| 2019/0158163 A1* | 5/2019 | Subramanian | H04B 7/0695 |
| 2019/0191416 A1 | 6/2019 | Xie et al. | |
| 2019/0215781 A1* | 7/2019 | Jeon | H04W 52/325 |
| 2019/0289570 A1* | 9/2019 | Kim | H04W 68/005 |
| 2019/0327761 A1* | 10/2019 | Suzuki | H04L 1/1819 |
| 2020/0053661 A1* | 2/2020 | Yang | H04W 52/383 |
| 2021/0006314 A1* | 1/2021 | Takeda | H04L 5/0094 |

FOREIGN PATENT DOCUMENTS

| | | | |
|---|---|---|---|
| EP | 3755039 A1 | 12/2020 | |
| WO | 2013107246 A1 | 7/2013 | |
| WO | 2018027992 A1 | 2/2018 | |
| WO | 2018036433 A1 | 3/2018 | |
| WO | 2019159296 A1 | 8/2019 | |

OTHER PUBLICATIONS

ISR issued in corresponding international application No. PCT/CN2019/082915 dated Jul. 1, 2019.

Communication pursuant to Article 94(3) EPC for EP Application 19799003.9 dated Jan. 31, 2021. (6 pages).

Indian Examination Report for IN Application 202017048277 dated Dec. 29, 2021. (7 pages).

Chinese First Office Action with English Translation for CN Application 201980004899.5 dated May 24, 2022. (12 pages).

Communication pursuant to Article 94(3) EPC for EP Application 19799003.9 dated Aug. 22, 2022. (6 pages).

Communication pursuant to Article 94(3) EPC for EP Application 19799003.9 dated Feb. 15, 2023. (7 pages).

Japanese Notice of Reasons for Refusal with English Translation for JP Application 2020561876 dated Mar. 17, 2023. (8 pages).

3GPP TSG RAN WG1 Meeting #83, R1-156837, Anaheim, USA, LG Electronics, Discussion on UE categories and capabilities, Nov. 15-22, 2015. (4 pages).

3GPP TSG RAN WG1 Meeting #88bis, R1-1705411, Spokane, USA, Samsung, DCI Formats and Contents for NR, Apr. 3-7, 2017. (5 pages).

3GPP TSG RAN WG1 Meeting #89, R1-1707508, Hangzhou, P.R. China, CATT, NR DL scheduling mechanism, May 15-19, 2017. (4 pages).

3GPP TSG RAN WG1 Meeting #89, R1-1707509, Hangzhou, P.R. China, CATT, NR UL scheduling mechanism, May 15-19, 2017. (2 pages).

3GPP TSG RAN WG1 Meeting #91, R1-1719389, Huawei, HiSilicon, DCI contents and formats in NR, Reno, USA, Nov. 27-Dec. 1, 2017. (11 pages).

* cited by examiner

METHOD FOR RESOURCE SCHEDULING AND NETWORK NODE

CROSS-REFERENCE TO RELATED APPLICATION(S)

This application is a continuation of PCT/CN2019/082915, filed on Apr. 16, 2019, which claims priority to and the benefit of U.S. provisional Application Ser. No. 62/667,502, filed on May 5, 2018, the entire disclosures of both of which are hereby incorporated by reference.

TECHNICAL FIELD

The application relates to wireless communication, and more particularly to a method, a network node, and a user equipment for resource scheduling.

BACKGROUND

In new radio (NR), users are generally scheduled in two manners, dynamic scheduling and semi-persistent scheduling (SPS).

For dynamic scheduling, the scheduling is performed in each transmission time interval (TTI).

While dynamic scheduling is great for bursty, infrequent, and bandwidth consuming data transmissions (e.g. web surfing, video streaming, emails), it is less suited for real time streaming applications such as voice calls. The solution for this is semi-persistent scheduling. Instead of scheduling each uplink or downlink transmission, a transmission pattern is defined instead of single opportunities. This significantly reduces the scheduling assignment overhead.

Both the dynamic scheduling and the SPS are not flexible enough in some respects.

SUMMARY

According to one aspect of the disclosure, a method for resource scheduling of a network node is provided. The method includes the following. Radio resources scheduled for user equipment (UE) are obtained. Scheduling information is transmitted to the UE. The scheduling information includes the scheduled radio resources, and is configured to instruct the UE to use the scheduled radio resources to transmit or receive data after a predetermined time or after a time indicated by the scheduling information.

In one implementation of the first aspect, the scheduling information further includes time information, and the time information is configured to instruct the UE to use the scheduled radio resources to transmit or receive data at a time indicated by the time information.

In one implementation of the first aspect, the time information is configured to trigger a timer configured at the UE and instruct the UE to use the scheduled radio resources to transmit or receive data when the timer expires.

In one implementation of the first aspect, the time information is a time offset and is configured to instruct the UE to use the scheduled radio resource to transmit or receive data at a time indicated by the time offset.

In one implementation of the first aspect, the scheduling information is carried on downlink control information or RRC signaling.

In one implementation of the first aspect, the scheduling information further includes at least one of a location of the scheduled radio resources and a type of the scheduled radio resources.

According to a second aspect of a disclosure, a network node for resource scheduling is provided. The network node is configured to obtain radio resources scheduled for UE and transmit to the UE scheduling information. The scheduling information includes the scheduled radio resources and is configured to instruct the UE to use the scheduled radio resources to transmit or receive data after a predetermined time or after a time indicated by the scheduling information.

In one implementation of the second aspect, the scheduling information further includes time information, and the time information is configured to instruct the UE to use the scheduled radio resources to transmit or receive data at a time indicated by the time information.

In one implementation of the second aspect, the time information is configured to trigger a timer configured at the UE and instruct the UE to use the scheduled radio resources to transmit or receive data when the timer expires.

In one implementation of the second aspect, the time information is a time offset and is configured to instruct the UE to use the scheduled radio resource to transmit or receive data at a time indicated by the time offset.

In one implementation of the second aspect, the scheduling information is carried on downlink control information or RRC signaling.

In one implementation of the second aspect, the scheduling information further includes at least one of a location of the scheduled radio resources and a type of the scheduled radio resources.

According to another aspect of the disclosure, a method for resource scheduling is provided. The method is performed at a UE and includes: UE receives scheduling information from a network node. The scheduling information includes scheduled radio resources determined by the network node and is configured to instruct the UE to use the scheduled radio resources to transmit or receive data after a predetermined time or after a time indicated by the scheduling information.

Implementations of various aspects of the disclosure can be combined or substituted with each other without conflict.

BRIEF DESCRIPTION OF DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. The same reference numerals are used throughout the drawings to reference like components or features.

DETAILED DESCRIPTION

The following description with reference to the accompanying drawings is provided to assist in a comprehensive understanding of example embodiments of the disclosure as defined by the claims and their equivalents. Various specific details are included to assist in that understanding but these are to be regarded as merely examples. In addition, descriptions of well-known functions and constructions may be omitted for clarity and conciseness.

Some terms used herein are given below for illustrative purpose only.

Physical downlink control channel (PDCCH): PDCCH is a physical channel that carries downlink control information (DCI). It is mapped to the first L orthogonal frequency division multiplexing (OFDM) symbols in every downlink subframe. Number of the symbols (L) for PDCCH can be 1, 2, or 3 for example.

Subframe: The LTE frame structures are of two types based on topology, either frequency division duplexing (FDD) or time division duplexing (TDD). Total Frame duration is about 10 ms. There are total 10 subframes in a frame. Each subframe is composed of 2 time slots.

TTI: TTI is a parameter related to encapsulation of data from higher layers into frames for transmission on the radio link layer. TTI refers to the duration of a transmission on the radio link. In the standard, it is generally considered that 1 TTI=1 ms, that is, the size of a subframe (1 subframe=2 slots).

DCI: DCI refer to downlink (DL) control information transmitted from the gNB to the UE, and can be carried on PDCCH. DCI includes but not limit to uplink (UL)/DL resource allocation, hybrid automatic repeat request (HARQ) information, power control information, and the like.

In order to receive physical downlink shared channel (PDSCH) or transmit physical uplink shared channel (PUSCH), generally, UE has to receive and decode PDCCH in which DCI is carried. DCI defines how to transmit PDSCH or PUSCH in air interfaces. UE obtains from DCI resource allocation information for scheduled PDSCH or PUSCH. DCI may include allocation information for both time domain resource and frequency domain resource. As can be seen, PDCCH carries all allocation information for both the downlink and uplink shared channels, that is, PDSCH and PUSCH, respectively.

Currently, two resource scheduling modes are available in new radio (NR), that is, dynamic scheduling and semi-persistent scheduling (SPS).

Figure 1:
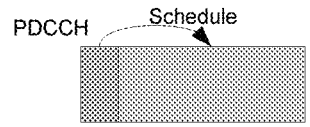
FIG. 1 and FIG. 2 are schematic diagrams illustrating dynamic scheduling.
Figure 2:
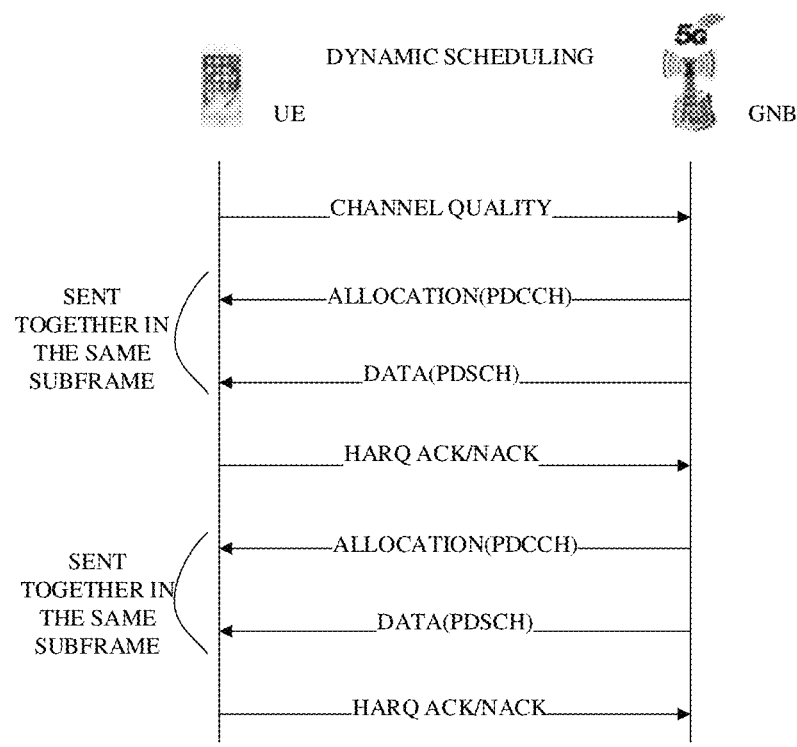

In dynamic scheduling mode, as mentioned above, the scheduling is performed in each TTI, that is, 1 ms: one sub-frame. As illustrated in FIG. 1 and FIG. 2, each new data packet has control signaling, such as PDCCH, to indicate resources and a transmission mode. UE receives downlink data and transmits uplink data according to the PDCCH delivered by the gNB in each TTI.

As mentioned above, during scheduling, each allocation is carried as a DCI and the size of the DCI depends upon several factors including whether it is for uplink or downlink allocation. Since the PDCCH is limited in size (generally, 3 OFDM symbol times), there is a limit as to how many DCIs can be carried in a subframe (1 ms). In order to support more allocations, without increasing the size of the PDCCH, SPS is proposed. Compared with dynamic scheduling, SPS can significantly reduce control channel overhead for applications that require persistent radio resource allocations such as VoIP.

Figure 3:
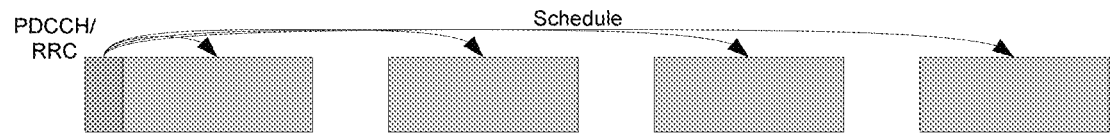
FIG. 3 and FIG. 4 are schematic diagrams illustrating SPS scheduling.
Figure 4:
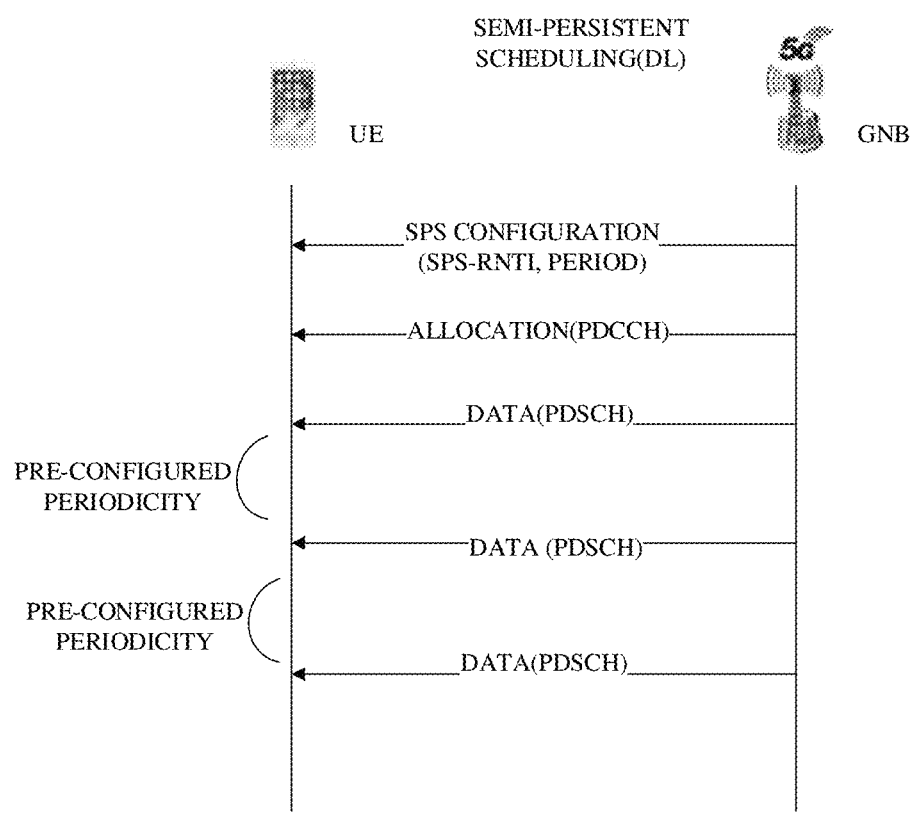

In SPS, generally, gNB pre-configures SPS function for a specific UE via configuring information such as SPS-Config, then the gNB will use a PDCCH scrambled with SPS C-RNTI (cell radio network temporary identifier) to activate the SPS function and allocate SPS resources. The UE can use the SPS resources periodically for data transmission or reception, and the gNB does not have to transmit a PDCCH or DCI indicative of resources allocated in subsequent SPS subframes. For example, as illustrated in FIG. 3 and FIG. 4, the SPS function is pre-configured by gNB with the SPS C-RNTI (allocation ID) and a periodicity. Once pre-configured, if the UE were to receive an allocation (DL/UL) using the SPS C-RNTI, then this one allocation would repeat according to the pre-configured periodicity.

Specifically, in SPS, resources can be scheduled periodically through PDCCH or radio resource control (RRC). For the PDCCH, it will configure periodicity in advance and will provide specific radio resource for the UE. Only after receiving the PDCCH, the UE will use the resource indicated in the PDCCH to periodically transmit data in downlink or uplink (DL/UL). For the RRC, it will configure the periodicity and resource together to the UE, and UE will use the specific resource to transmit data in the periodicity configured by the RRC.

During SPS, the UE still have to monitor PDCCH for dynamic scheduling. If the UE receives a PDCCH scrambled by C-RNTI in the SPS subframe, i.e., dynamic scheduling, the resources allocated by the PDCCH will replace SPS resources in the current subframe since the dynamic scheduling has a higher priority than SPS. But the PDCCH for dynamic scheduling is valid only for the current subframe and will not affect subsequent subframes.

In addition to the foregoing SPS activation, SPS deactivation is also required. Once SPS service is finished, gNB will use another PDDCH scrambled with SPS C-RNTI to release the SPS resources.

Figure 5:
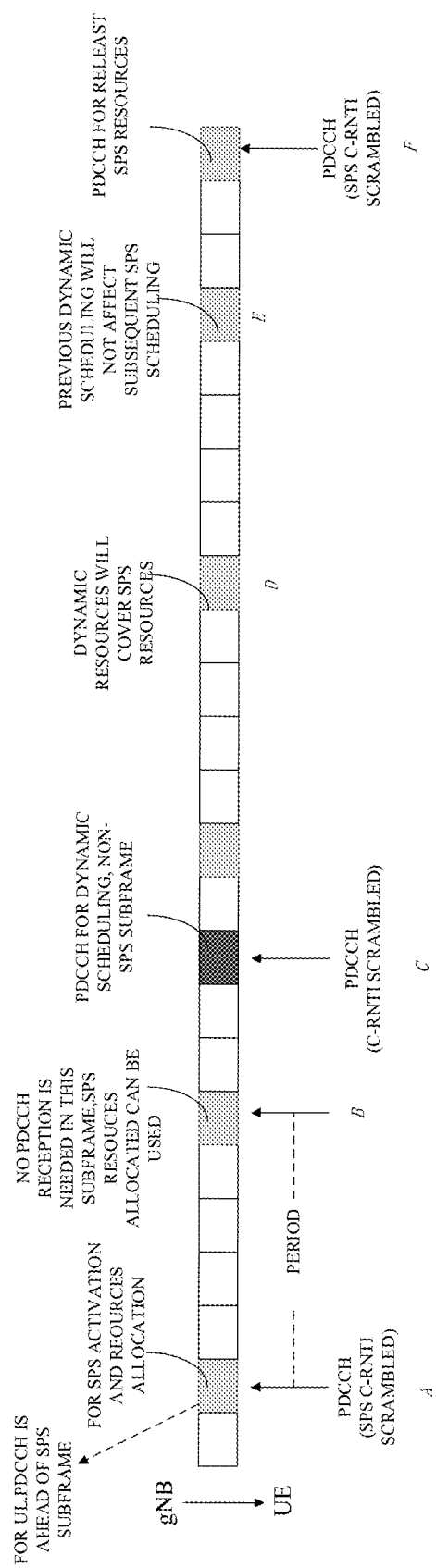
FIG. 5 is a schematic diagram illustrating switching between dynamic scheduling and SPS scheduling.

SPS activation, SPS deactivation, and switching between dynamic scheduling and SPS are further illustrated in FIG. 5. In FIG. 5, in subframe A, SPS is activated and SPS resources are allocated with a PDCCH scrambled by SRS C-RNTI. In subframe B, UE can use the SPS allocated to transmit or receive data. In subframe C, a PDCCH for dynamic scheduling is received and in subframe D, the SPS resources are covered by the dynamic resources because the dynamic scheduling has higher priority than SPS, but the dynamic scheduling will not affect subsequent SPS scheduling, consequently, in subframe E, SPS resources are used again. Then in subframe F, a PDCCH for releasing SPS resources is received and at this time, this round of SPS scheduling is finished. The PDCCH for releasing SPS resources can be occurred in any subframe.

Both the dynamic scheduling and the SPS are not flexible enough. While dynamic scheduling is relatively flexible compared with SPS, it can only act on the current subframe. The SPS can schedule several future subframes periodically, but SPS resources activation and release is required, and this occupies signaling resources. In view of the above, a new scheduling scheme is provided herein, in which future resources can be pre-configured for the UE without additional activation. The new scheduling scheme is especially useful under circumstances where there are UL transmission/DL reception requirements for some signaling/data which will definitely transmitted later.

In the following, embodiments of the disclosure will be described in detail. It should be noted that, the term "embodiment" or "implementation" referred to herein means that a particular feature or structure described in conjunction with the embodiment may be contained in at least one embodiment of the present disclosure. The phrase appearing in various places in the specification does not necessarily refer to the same embodiment, nor does it refer to an independent or alternative embodiment that is mutually exclusive with other embodiments. It is expressly and implicitly understood by those skilled in the art that an embodiment described herein may be combined with other embodiments.

Figure 6:
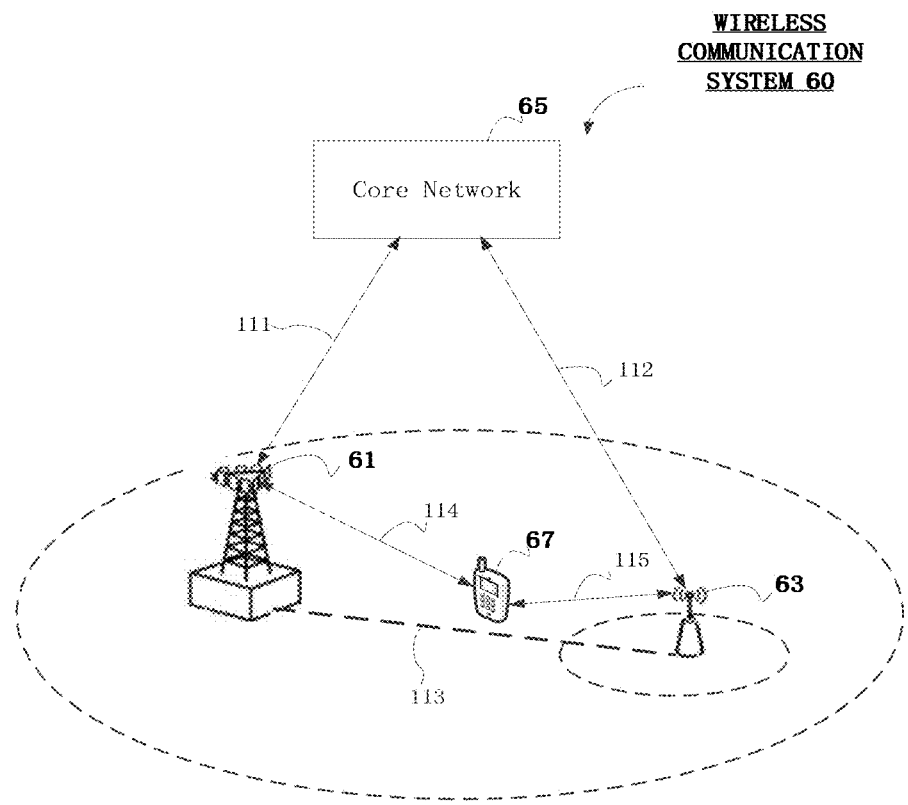
FIG. 6 is a schematic diagram illustrating a wireless communication system involved herein.

FIG. 6 illustrates system architecture of a wireless communication system involved in this application. The wireless communication system can work in the high frequency band and can be a LTE system, 5G system, NR system, M2M (Machine to Machine) system, and the like. As illustrated in FIG. 6, the wireless communication system 60 may include a master node (MN) 61, a secondary node (SN) 63, one or more terminal device 67, and a core network 65. The terminal device 67 establishes connection with the MN 61 the SN 63 respectively.

The MN 61 and the SN 63 are network equipment. For example, the MN 61 or the SN 63 can be a base transceiver station (BTS) in a time division synchronous code division multiple access (TD-SCDMA) system, an eNB in a LTE system, a gNB in a NR system. From another perspective, the MN 61 or the SN 63 can be an access point (AP), a central unit, or other network entities, and may include all or part of the functions of the above network entities.

The terminal device 67 can be distributed over the entire wireless communication system 60, and can be stable or mobile. The terminal device 67 can be implemented as a mobile device, a mobile station, a mobile unit, a M2M terminal, a wireless unit, a remote unit, an user gent, a mobile client, and the like.

Figure 7:
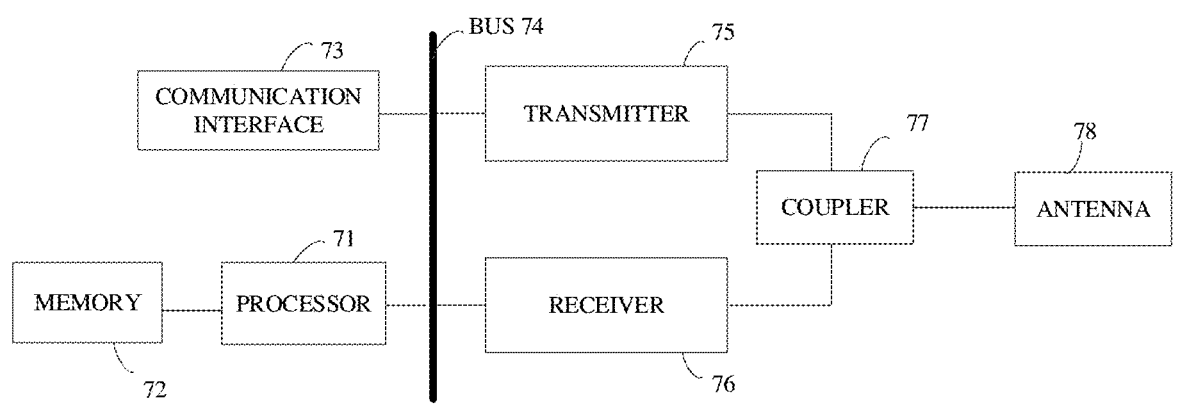
FIG. 7 is a schematic diagram illustrating a gNB involved herein.

FIG. 7 is a diagram illustrating MN or SN (collectively known as a network node) according to an implementation. Network node 70 can be functioned an eNB or gNB illustrated in FIG. 6. As illustrated in FIG. 7, the network node 70 includes one or more network device processors 71, a memory 72, a communication interface 73, a transmitter 75, and a receiver 76. These components may be connected via a bus 74 or other means. As illustrated in FIG. 7, the network node 70 may further include a coupler 77 and an antenna 78 connected to the coupler 77.

Communication interface 73 can be a LTE (4G) communication interface, a 5G communication interface, or a future new air interface. Communication interface 73 may be used for network node 70 to communicate with other communication devices, such as user equipment of FIG. 6 or other network devices. The network node 70 may also be equipped with a wired interface for wired communication.

Transmitter 75 may be used to transmit signals output from network device processor 71, such as perform signal modulation. In implementations of the signal transmission of the disclosure, the transmitter 75 can be configured to transmit a control message in various manners given later. Receiver 76 can be used for receiving and/or processing of signals received via antenna 78, for example, signal demodulation. In some implementations, the transmitter 75 and the receiver 76 can be considered as a wireless modem. In the network node 70, more than one transmitter 75 can be provided. Similarly, more than one receiver 76 can be provided.

Network device processor 71 can be responsible for wireless channel management, communication link establishment, and cell switching control for users within a control area. Network device processor 71 can also read and execute computer readable instructions such as those stored in memory 72 which is coupled thereto. Memory 72 is configured to store various software programs and/or instructions, operating systems, and network communication programs or protocols. Memory 72 may include high speed random access memory (RAM), and can also include non-transitory memory, such as one or more disk storage devices, flash memory devices, or other nonvolatile solid-state storage devices.

It should be noted that, the structure illustrated in FIG. 7 can be equally applied to terminals which can communicate with the network node. For example, in case of a UE with the structure illustrated in FIG. 7, the receiver 76, the communication interface 73, and/or the antenna 78 can be applied to receive the control message from the network node, the receiver 76 may further demodulate the information and forward the demodulated information to the processor 71 for a subsequent process or may store the demodulated information in the memory 72.

Based on the above structures and with the understating that the principles of the disclosure can apply more generally to any wireless communication environment, in the following, gNB is taken as an example of the MN 61 or the SN 63 which can carry out resource scheduling for the UE.

According to implementations of the disclosure, a method for scheduling resource is provided. The method is applicable to a network node such as the gNB illustrated in FIG. 7. During DL/UL communication between the gNB and UE, there are some signaling/data which will definitely transmitted later, for example, RRC reconfiguration, connection setup, handover complete, connection establishment complete, connection resume complete, etc. With aid of the method provided herein, it is possible to indicate that some resource is pre-scheduled for some signaling/data which will definitely occurs later.

Figure 8:
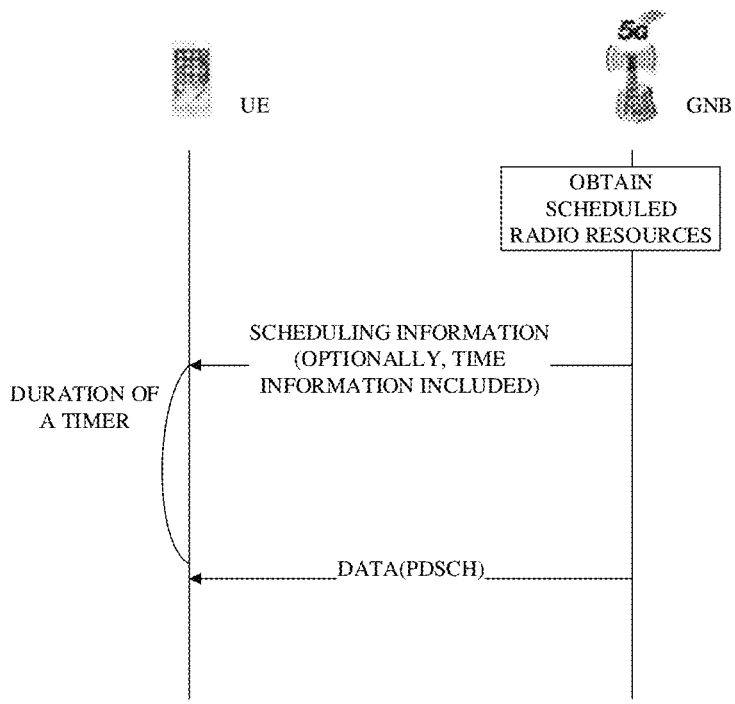
FIG. 8 to FIG. 10 are schematic diagrams each illustrating a scheduling scheme provided herein.

In the method for scheduling resource, radio resources scheduled for UE are obtained, and scheduling information, which contains the scheduled radio resources, is transmitted to the UE. The scheduling information is configured to instruct the UE to use the scheduled radio resources to transmit or receive data after a predetermined time or after a time indicated by the scheduling information. Such communication between the gNB and the UE is illustrated in FIG. 8.

The radio resources thus allocated can be used for uplink transmission or downlink transmission. For example, the UE can use the resources thus allocated for UE feedback, such as complete message for connection request, handover, and the like, or even packet data.

The scheduling information can be carried by downlink control information or RRC signaling.

The scheduling information may further includes all information for specific radio resources which are the same as existing LTE or NR specification, for example, a flag or filed such as Config_UL or Config_DL indicative of UL resource or DL resource respectively, or information indicative of a location of the scheduled radio resources.

In order to expedite the understanding of the disclosure, certain implementations will be described.

In order to instruct the UE to use the scheduled radio resources to transmit or receive data after a predetermined time, the predetermined time can be determined in advance in various manners. For example, the predetermined time can be determined by the gNB and the UE in advance through negotiation. Alternatively, the predetermined time can be generally specified in specification or standard. In this way, the gNB and UE can both know the resources will be there after, e.g. 4 ms (the predetermined time).

In this case, since the predetermined time is both known to the gNB and the UE, once the scheduling information is received, the UE will be aware of data transmission using the scheduled radio resources after the predetermined time.

Alternatively, the scheduling information can further include time information, which, as the name suggests, is configured to instruct the UE to use the scheduled radio resources to transmit or receive data at a time indicated by the time information. In other words, the time information is for indicating when the resources are activated, or, when the resources allocated by the network side are activated for use.

In terms of the time information, it can be timer or offset related, which will be detailed below.

Figure 9:
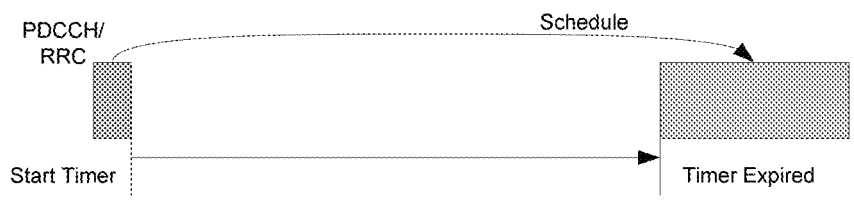

In one implementation, the time information is timer related. Specifically, the time information is configured to trigger a timer configured at the UE and instruct the UE to use the scheduled radio resources to transmit or receive data when the timer expires. The timer can be configured to have a duration such as several (x ms) millisecond. As illustrated in more detail in FIG. 9, once the scheduling information is received, the UE will start the timer and when the timer expires, the UE can use the scheduled radio resources for data transmission.

Alternatively, the timer is not necessarily configured at the UE. The time information per se can be the timer and in this case, once the scheduling information is received, the UE obtains from the scheduling information the timer to start the same, and can use the scheduled radio resources for data transmission when the timer expires.

In addition to or instead of the timer, the time information can be a time offset, which is configured to instruct the UE to use the scheduled radio resource to transmit or receive data at a time indicated by the time offset, that is, transmit or receive data when the time offset elapsed. In this case, when the time offset elapsed, the resource is activated.

Both the timer and the time offset contribute to advantages of the disclosure and can be chosen according to message design.

In the method provided herein, with aid of the timer or time offset, which could be based on ms, system frame number (SFN), or other means, compared with SPS, there is no need for the gNB to activate or notify activation of the resource allocated separately, which can reduce system overhead. With this method, the network side (gNB) could provide the scheduling information for the signaling/data which will happen some time later, e.g. several (x ms) millisecond.

In one implementation, the time information can also be configured to instruct the deactivation (that is, release time) of the scheduled radio resource.

Figure 10:
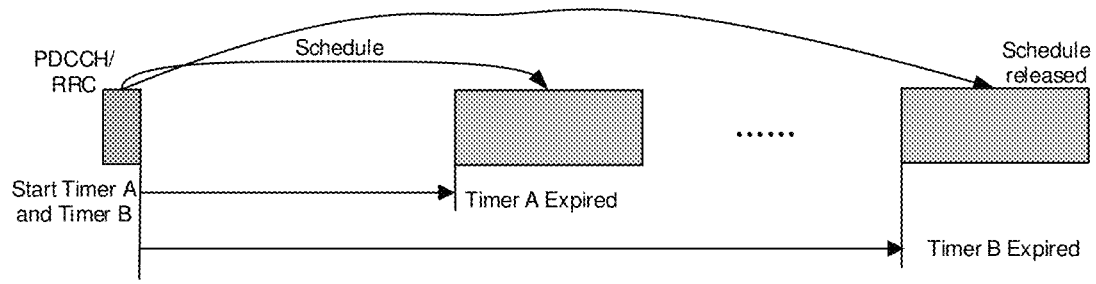

In order for this, two timers or two time offsets can be configured at or provided for the UE. Taking two timers for example, where one of them is for indicating the activation time and the other is for indicating the deactivation time, details thereof are illustrated in FIG. 10. In FIG. 10, Timer A and Timer B are provided, with Timer A indicates the activation time and Timer B indicates the deactivation time. Timer B has duration longer than Timer A. Timer A and Timer B both starts when the scheduling information containing the time information is received at the UE. When Timer A expires, the resource is activated, which means that the UE can use the resource to transmit or receive data. Since Timer B has duration longer than Timer A, Timer B expires later than Timer A. When Timer B expires, the resource allocated is no longer available for the UE and is released. As such, the scheduling is deactivated.

From another perspective, it can be comprehended that with Timer A and Timer B, a time window is defined, and UE can use resources allocated for data transmission or reception within the time window.

The foregoing methods have been described from the perspective of the gNB. In the following, methods provided herein will be further described from the perspective of the UE. For ease of explanation, details relating to principles of the disclosure, which is adapted to both the gNB and UE, will not be repeated to avoid redundancy.

At the UE, the scheduling information will be received from the gNB. As mentioned above, the scheduling information includes scheduled radio resources determined by the network node and is used to instruct the UE to use the scheduled radio resources to transmit or receive data after a predetermined time or after a time indicated by the scheduling information. Therefore, once the scheduling information is received, the UE determines the scheduled radio resources and use the scheduled radio resources to transmit or receive data after a predetermined time or after a time indicated by the scheduling information.

As mentioned above, the predetermined time can be negotiated by the gNB and the UE in advance or can be defined in specification or standard of communication industry.

The time indicated by the scheduling information can be a timer or offset for example. The timer is trigged when the scheduling information is received, and similarly, the time offset starts when the scheduling information is received. Accordingly, the UE can transmit or receive data when the timer expires or when the time offset is elapsed.

Compatibility with Existing Scheduling Schemes

Design of the scheduling scheme of the disclosure also takes compatibility with existing scheduling schemes into consideration, such that the scheduling scheme provided herein can be used in parallel or together with existing scheduling schemes such as SPS scheduling without conflict.

As one implementation, the scheduling information transmitted to the UE may further contain a periodicity and a flag (specifically, SPS flag), for example, in addition to the timer (time information). The periodicity can be treated as time domain resource to distinguish from the frequency domain resource. The flag is for indicating that the resource allocated or to be allocated is periodically scheduled according to the periodicity after activation of the resource. In this case, after the scheduling information is received at the UE, when the timer expires, the UE can use the resource allocated for UL/DL transmission, and then the UE can continue to use the resource periodically according to the periodicity, for example, every 5 ms.

In the above process, both the SPS scheduling and the scheduling scheme provided herein are achieved in one process without conflict.

During the scheduling process provided herein, the UE may still have to monitor other scheduling on PDCCH for example. As can be imagined, there may be a situation that, before the timer expires or before the time offset elapsed, a SPS scheduling or dynamic scheduling PDCCH is received. In this case, we can predefine the priority for each scheduling scheme, and the pre-scheduling scheme provided herein can have a predefined priority, specifically, has a predefined priority with respect to other scheduling schemes. For example, as one possibility, the dynamic scheduling has the top priority, then the SPS scheduling, and the pre-scheduling scheme according to the implementations of the disclosure as the lowest priority. Still another possibility, the dynamic scheduling has the top priority, followed by the re-scheduling scheme according to the implementations of the disclosure, and at the end, the SPS scheduling.

Various priority designs are possible, as long as it can avoid conflicts between different scheduling schemes.

Continuing, in case that the scheduling scheme has a priority lower than the SPS scheduling, if a SPS scheduling PDCCH is received, the SPS scheduling will take over the pre-scheduling provide herein. But if the timer is set to have duration long enough, the SPS scheduling may be released before the timer expires, then the pre-scheduling scheme can be recovered to wait for the timer to expire.

Still another example, if a dynamic scheduling PDCCH is receive, the dynamic scheduling will take over the pre-scheduling provide herein. Similarly, since the dynamic scheduling acts only on the current subframe without affecting subsequent subframes, if the timer is still in process when the dynamic scheduling is finished, the pre-scheduling of the disclosure can be recovered and the resource will be activated when the timer expires, as described above.

In terms of how to avoid conflicts between different scheduling schemes, further configuration can be made at the network side and will not go into much detail herein.

In the following, we further provide a network node and user equipment, which can be configured to implement the method for resource pre-scheduling at the network side and the user equipment side respectively. The network node here is a gNB for example.

The gNB provided herein can be configured to obtain radio resources scheduled for UE, and to transmit to the UE scheduling information, which contains the scheduled radio resources and is configured to instruct the UE to use the scheduled radio resources to transmit or receive data after a predetermined time or after a time indicated by the scheduling information.

In order to achieve the scheduling information transmission, the gNB can be structured to have a transmitter or a transceiver, which can transmit messages, signaling, or data via PDCCH. For example, the gNB can be structured as that illustrated in FIG. 7.

The User equipment provided herein can be configured to receive the scheduling information and decode the same. The scheduling information contains scheduled radio resources and is configured to instruct the UE to use the scheduled radio resources to transmit or receive data after a predetermined time or after a time indicated by the scheduling information.

For example, the UE can be structured as that illustrated in FIG. 7. In order to achieve the control message reception, the UE can be structured to have a receiver or a transceiver. The receiver or transceiver can have a message parsing function for example.

As described, this disclosure provides methods and equipment for scheduling for some signaling/data which will happen definitely in future. One of ordinary skill in the art can understand that all or part of the process for implementing the above embodiments can be completed by a computer program to instruct related hardware, and the program can be stored in a non-transitory computer readable storage medium. In this regard, according to embodiments of the disclosure, a non-transitory computer readable storage medium is provided. The non-transitory computer readable storage medium is configured to store at least one computer readable program which, when executed by a computer, cause the computer to carry out all or part of the operations of the method for pre-scheduling resource of the disclosure. Examples of the non-transitory computer readable storage medium include but are not limited to read only memory (ROM), random storage memory (RAM), disk or optical disk, and the like.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for resource scheduling of a network node, comprising:
   obtaining time-frequency resources scheduled for user equipment (UE); and
   transmitting scheduling information to the UE, wherein the scheduling information comprises the scheduled time-frequency resources and time information,
   wherein the scheduling information is configured to indicate an activation time of the scheduled time-frequency resources and instruct the UE to use the scheduled time-frequency resources to transmit or receive data after a predetermined time has elapsed from the UE having received the scheduling information,
   wherein the predetermined time is determined by the network node and the UE in advance through negotiation or is specified in specification or standard,
   wherein the scheduled time-frequency resources are activated when the predetermined time has elapsed from the UE having received the scheduling information,
   wherein the scheduling information has a predefined priority at least with respect to semi-persistent scheduling and dynamic scheduling,
   wherein the time information is configured to instruct the UE to use the scheduled time-frequency resources to transmit or receive data at a time indicated by the time information, and
   wherein
      the time information comprises a first time offset and a second time offset, the first time offset is configured to instruct the UE to use the scheduled time-frequency resources to transmit or receive data at a time indicated by the first time offset, the second time offset is configured to indicate for the UE that the scheduled time-frequency resources are no longer available for the UE at a time indicated by the second time offset, and the time indicated by the second time offset is longer than the time indicated by the first time offset, or
      the time information is configured to trigger a first timer and a second timer configured at the UE at the same time when the UE has received the scheduling information, instruct the UE to use the scheduled time-frequency resources to transmit or receive data when the first timer expires, and indicate for the UE that the scheduled time-frequency resources are no longer available for the UE when the second timer expires, the second timer expires later than the first timer, the first timer is used for indicating the activation time of the scheduled time-frequency resources, and the second timer is used for indicating the deactivation time of the scheduled time-frequency resources.

2. The method of claim 1, wherein the scheduling information is transmitted on a physical layer control channel or is carried by downlink control information or RRC signaling.

3. The method of claim 1, further comprising:
transmitting data to the UE or receiving data from the UE, with the activated scheduled time-frequency resources, after the predetermined time has elapsed from the UE having received the scheduling information.

4. The method of claim 1, wherein the scheduling information further comprises at least one of a period for the scheduled time-frequency resources, a time-frequency location of the scheduled time-frequency resources, or a type of the scheduled time-frequency resources.

5. The method of claim 1, wherein a priority of the semi-persistent scheduling is lower than that of the dynamic scheduling; and a priority of the scheduling information is higher than the priority of the semi-persistent scheduling, or the priority of the scheduling information is lower than the priority of the semi-persistent scheduling.

6. A network node for resource scheduling, being configured to:
obtain time-frequency resources scheduled for user equipment (UE); and
transmit scheduling information to the UE, wherein the scheduling information comprises the scheduled time-frequency resources and time information,
wherein the scheduling information is configured to indicate an activation time of the scheduled time-frequency resources and instruct the UE to use the scheduled time-frequency resources to transmit or receive data after a predetermined time has elapsed from the UE having received the scheduling information,
wherein the predetermined time is determined by the network node and the UE in advance through negotiation or is specified in specification or standard,
wherein the scheduled time-frequency resources are activated when the predetermined time has elapsed from the UE having received the scheduling information,
wherein the scheduling information has a predefined priority at least with respect to semi-persistent scheduling and dynamic scheduling,
wherein the time information is configured to instruct the UE to use the scheduled time-frequency resources to transmit or receive data at a time indicated by the time information, and
wherein
the time information is configured to trigger a first timer and a second timer configured at the UE at the same time when the UE has received the scheduling information, instruct the UE to use the scheduled time-frequency resources to transmit or receive data when the first timer expires, and indicate for the UE that the scheduled time-frequency resources are no longer available for the UE when the second timer expires, the second timer expires later than the first timer, the first timer is used for indicating the activation time of the scheduled time-frequency resources, and the second timer is used for indicating the deactivation time of the scheduled time-frequency resources, or
the time information comprises a first time offset and a second time offset, the first time offset is configured to instruct the UE to use the scheduled time-frequency resources to transmit or receive data at a time indicated by the first time offset, the second time offset is configured to indicate for the UE that the scheduled time-frequency resources are no longer available for the UE at a time indicated by the second time offset, and the time indicated by the second time offset is longer than the time indicated by the first time offset.

7. The network node of claim 6, wherein the scheduling information is carried by downlink control information or RRC signaling.

8. The network node of claim 6, wherein the scheduling information further comprises at least one of a period for the scheduled time-frequency resources, a time-frequency location of the scheduled time-frequency resources, or a type of the scheduled time-frequency resources.

9. The network node of claim 6, wherein a priority of the semi-persistent scheduling is lower than that of the dynamic scheduling; and a priority of the scheduling information is higher than the priority of the semi-persistent scheduling, or the priority of the scheduling information is lower than the priority of the semi-persistent scheduling.

10. A method for resource scheduling, performed at a user equipment (UE) and comprising:
receiving, from a network node, scheduling information, wherein the scheduling information comprises scheduled time-frequency resources determined by the network node and time information, the scheduling information is configured to indicate an activation time of the scheduled time-frequency resources and instruct the UE to use the scheduled time-frequency resources to transmit or receive data after a predetermined time has elapsed from the UE having received the scheduling information, the scheduled time-frequency resources are activated when the predetermined time has elapsed from the UE having received the scheduling information, and the predetermined time is determined by the network node and the UE in advance through negotiation or is specified in specification or standard;
transmitting or receiving data with the activated scheduled time-frequency resources after the predetermined time has elapsed; and
transmitting or receiving, on the scheduled time-frequency resources, data at a time indicated by the time information,
wherein the scheduling information has a predefined priority at least with respect to semi-persistent scheduling and dynamic scheduling, and
wherein
the time information comprises a first time offset and a second time offset, the first time offset is configured to instruct the UE to use the scheduled time-frequency resources to transmit or receive data at a time indicated by the first time offset, the second time offset is configured to indicate for the UE that the scheduled time-frequency resources are no longer available for the UE at a time indicated by the second time offset, and the time indicated by the second time offset is longer than the time indicated by the first time offset; or
the time information is configured to trigger a first timer and a second timer configured at the UE at the same time when the UE has received the scheduling information, instruct the UE to use the scheduled time-frequency resources to transmit or receive data when the first timer expires, and indicate for the UE that the scheduled time-frequency resources are no longer available for the UE when the second timer expires, and the second timer expires later than the first timer, the first timer is used for indicating the activation time of the scheduled time-frequency resources, and the second timer is used for indicating the deactivation time of the scheduled time-frequency resources.

11. The method of claim 10, wherein the scheduling information is carried by downlink control information or RRC signaling.

12. The method of claim 10, wherein the scheduling information further comprises at least one of a period for the scheduled time-frequency resources, a time-frequency location of the scheduled time-frequency resources, or a type of the scheduled time-frequency resources.

13. The method of claim 10, wherein a priority of the semi-persistent scheduling is lower than that of the dynamic scheduling; and a priority of the scheduling information is higher than the priority of the semi-persistent scheduling, or the priority of the scheduling information is lower than the priority of the semi-persistent scheduling.

\* \* \* \* \*